(12) United States Patent
Goebel et al.

(10) Patent No.: US 9,616,596 B2
(45) Date of Patent: *Apr. 11, 2017

(54) METHOD AND DEVICE FOR THE PRODUCTION OF FORM PARTS

(71) Applicant: HENNECKE GMBH, Sankt Augustin (DE)

(72) Inventors: Frank Goebel, Cologne (DE); Bernhard Willing, Bonn (DE)

(73) Assignee: HENNECKE GMBH, Sankt Augustin (DE)

( * ) Notice: Subject to any disclaimer, the term of this patent is extended or adjusted under 35 U.S.C. 154(b) by 459 days.

This patent is subject to a terminal disclaimer.

(21) Appl. No.: 14/132,384

(22) Filed: Dec. 18, 2013

(65) Prior Publication Data

US 2014/0175701 A1    Jun. 26, 2014

(51) Int. Cl.
*B29C 31/00* (2006.01)
*B29C 33/36* (2006.01)
(Continued)

(52) U.S. Cl.
CPC ............ *B29C 31/006* (2013.01); *B29C 33/36* (2013.01); *B29C 67/246* (2013.01);
(Continued)

(58) Field of Classification Search
None
See application file for complete search history.

(56) References Cited

U.S. PATENT DOCUMENTS 2,095,151 A * 10/1937 Schoelm ............... B22D 33/02
                                                        164/130
2,154,967 A *  4/1939 Wurster ................ B22C 21/08
                                                        164/324
(Continued)

FOREIGN PATENT DOCUMENTS

DE    44 44 280 C2    6/1996
DE    44 44 280 C2    10/1996
(Continued)

OTHER PUBLICATIONS

European Search Report.

*Primary Examiner* — Jeffrey Wollschlager
(74) *Attorney, Agent, or Firm* — Lucas & Mercanti, LLP

(57) ABSTRACT

The invention relates to a method for the production of form parts from multi-component reactive plastic material, especially from polyurethane, wherein a plurality of moulds are moved by means of mould carriages (1) at least temporarily along a closed, preferably oval, production line (2). To allow a simple and quick import and export of mould carriages in the respectively out of the production line the invention proposes that the mould carriages (1) are provided with rolls (3) and are moved on a stationary ground (4) by the same and that a plurality of supply carriages (6) are arranged along the closed production line (2) at a conveying element (5), which supply carriages (6) are moved by means of the conveying elements (5), wherein a mould carriage (1) is approached to a not occupied supply carriage (6) and is coupled with the same to introduce the mould carriage (1) into the production line (2), wherein for the movement along the production line (2) the mould carriage (1) is guided and moved by the supply carriage (6) in a coupled state between the mould carriage (1) and the supply carriage (6) and wherein the mould carriage (1) is decoupled from the supply carriage (6) and is moved away from the production line (2)

(Continued)

Figure 1:
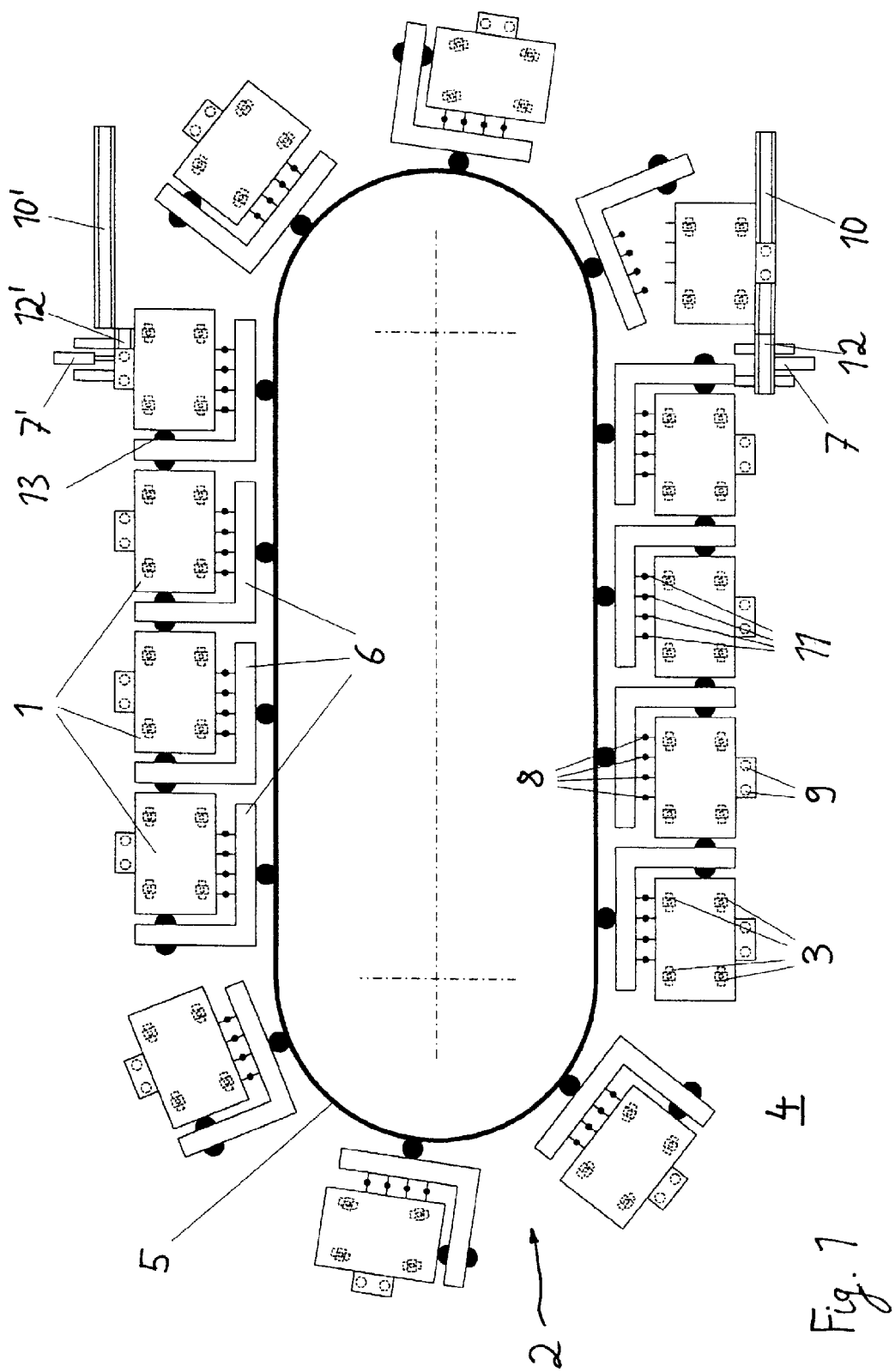
Figure 2:
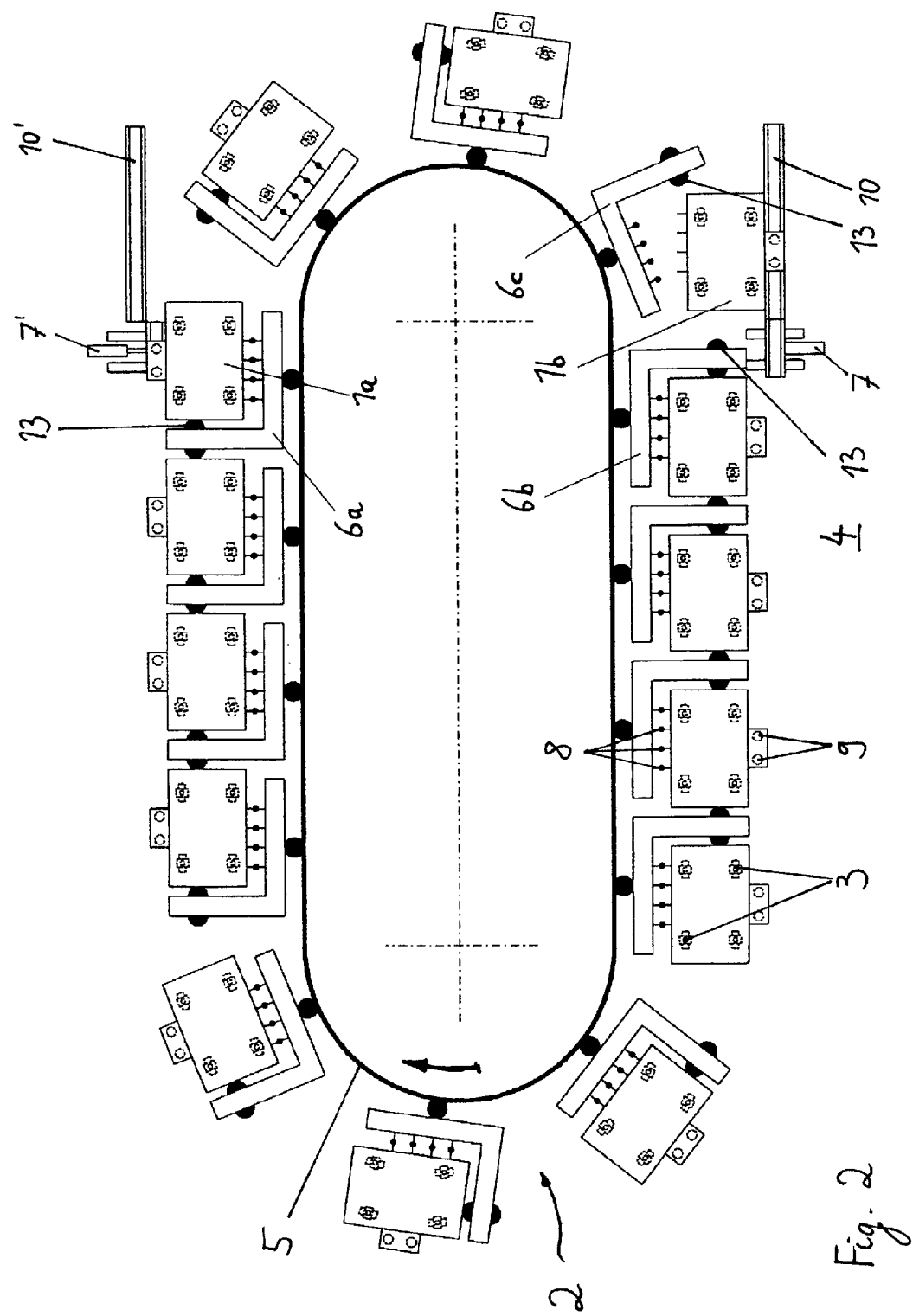
Figure 3:
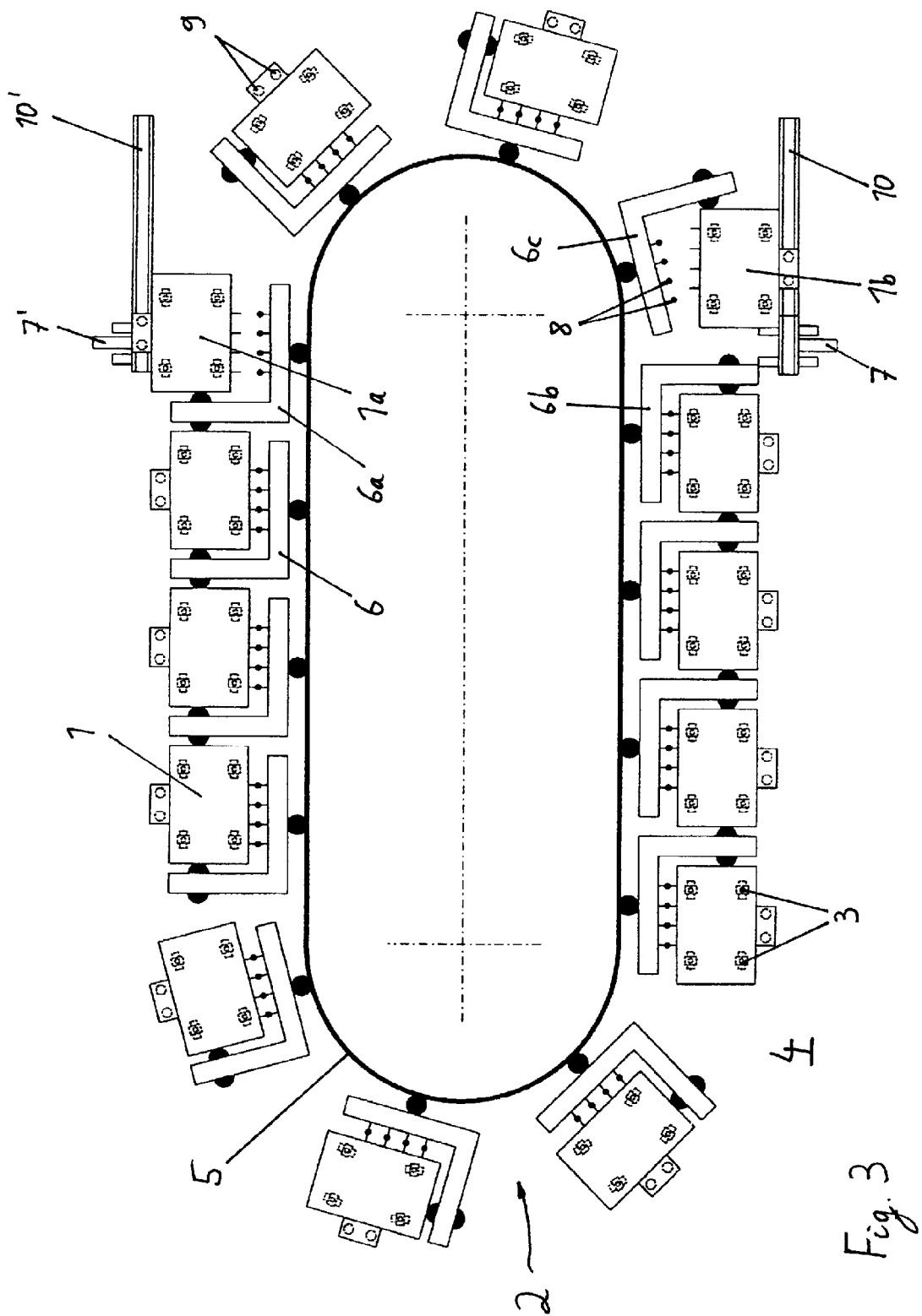
Figure 4:
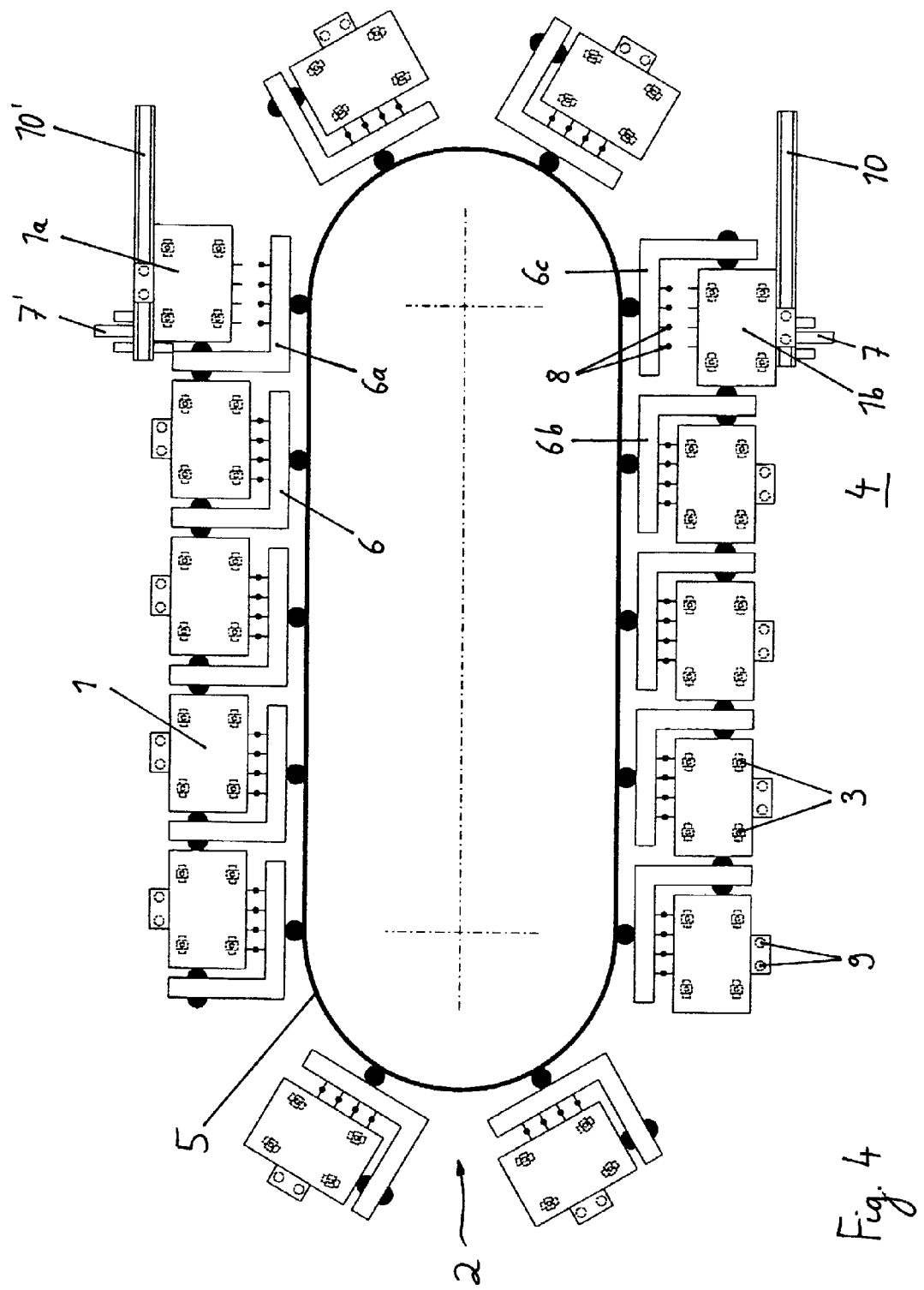

for taking the mould carriage (1) out of the production line (2), wherein here the mould carriage (1) is moved with its roils (3) on the stationary ground (4). Furthermore, the invention relates to a respective device.

7 Claims, 5 Drawing Sheets

(51) Int. Cl.

| | |
|---|---|
| *B29C 67/24* | (2006.01) |
| *B29C 45/26* | (2006.01) |
| *B29C 43/36* | (2006.01) |
| *B29C 33/00* | (2006.01) |
| *B29C 44/18* | (2006.01) |
| *B29C 43/46* | (2006.01) |
| *B29C 45/04* | (2006.01) |
| *B29C 45/32* | (2006.01) |
| *B29C 45/27* | (2006.01) |
| *B29C 45/06* | (2006.01) |
| *B29C 43/04* | (2006.01) |
| *B29C 43/08* | (2006.01) |
| *B29C 43/06* | (2006.01) |
| *B29C 33/34* | (2006.01) |
| *B29K 75/00* | (2006.01) |

(52) U.S. Cl.
CPC .......... *B29C 33/0022* (2013.01); *B29C 33/34* (2013.01); *B29C 43/04* (2013.01); *B29C 43/06* (2013.01); *B29C 43/08* (2013.01); *B29C 43/085* (2013.01); *B29C 44/186* (2013.01); *B29C 45/04* (2013.01); *B29C 45/045* (2013.01); *B29C 45/0408* (2013.01); *B29C 45/0416* (2013.01); *B29C 45/0433* (2013.01); *B29C 45/0441* (2013.01); *B29C 45/06* (2013.01); *B29C 45/2704* (2013.01); *B29C 45/32* (2013.01); *B29C 2043/043* (2013.01); *B29C 2043/046* (2013.01); *B29C 2043/3678* (2013.01); *B29C 2043/465* (2013.01); *B29C 2045/0475* (2013.01); *B29C 2045/065* (2013.01); *B29C 2045/2651* (2013.01); *B29C 2045/2683* (2013.01); *B29C 2045/2712* (2013.01); *B29K 2075/00* (2013.01)

(56) References Cited

U.S. PATENT DOCUMENTS

| | | | | |
|---|---|---|---|---|
| 2,701,399 | A * | 2/1955 | Underwood | B22D 33/06 425/353 |
| 3,247,295 | A * | 4/1966 | Burwell | B29C 31/045 264/331.19 |
| 3,739,050 | A * | 6/1973 | Koncz et al. | B28B 5/04 264/297.9 |
| 3,794,151 | A | 2/1974 | Feasey | |
| 3,824,062 | A * | 7/1974 | Farrell | B29C 33/22 425/451 |
| 3,924,995 | A * | 12/1975 | Crooks | B29C 45/0433 425/119 |
| 3,973,891 | A * | 8/1976 | Yamada | B29C 45/0433 425/451 |
| 4,102,964 | A * | 7/1978 | Ridgeway | B29C 51/00 264/255 |
| 4,233,907 | A * | 11/1980 | Brown | B22D 33/02 104/172.3 |
| 4,373,885 | A * | 2/1983 | Smyth | B29C 33/36 264/102 |
| 4,383,818 | A * | 5/1983 | Swannell | B29C 33/202 198/465.3 |
| 4,439,123 | A * | 3/1984 | Sano | B29C 43/203 425/112 |
| 4,737,091 | A * | 4/1988 | Fiorentini | B23Q 7/1442 249/161 |
| 4,751,029 | A * | 6/1988 | Swanson | B29C 31/044 264/40.4 |
| 4,759,439 | A * | 7/1988 | Hartlepp | B61B 13/127 104/208 |
| 4,950,149 | A * | 8/1990 | Schehr | B29C 33/36 425/345 |
| 5,217,727 | A * | 6/1993 | Kameyama | B22D 33/00 425/185 |
| 6,589,470 | B2 * | 7/2003 | Fried | B29C 41/18 264/102 |
| 6,889,816 | B2 * | 5/2005 | Willing | B23Q 7/1431 198/465.2 |
| 2009/0171497 | A1 * | 7/2009 | Sacchi | B29C 45/0433 700/197 |

FOREIGN PATENT DOCUMENTS

| | | |
|---|---|---|
| DE | 20 2010 005 011 U1 | 7/2010 |
| DE | 20 2010 005011 U1 | 7/2010 |
| EP | 0 919 325 A2 | 6/1999 |
| EP | 1 033 230 A1 | 9/2000 |
| JP | S61226356 A | 10/1986 |
| JP | 2006 067915 A | 6/2006 |
| WO | 99/10155 A2 | 3/1999 |

* cited by examiner

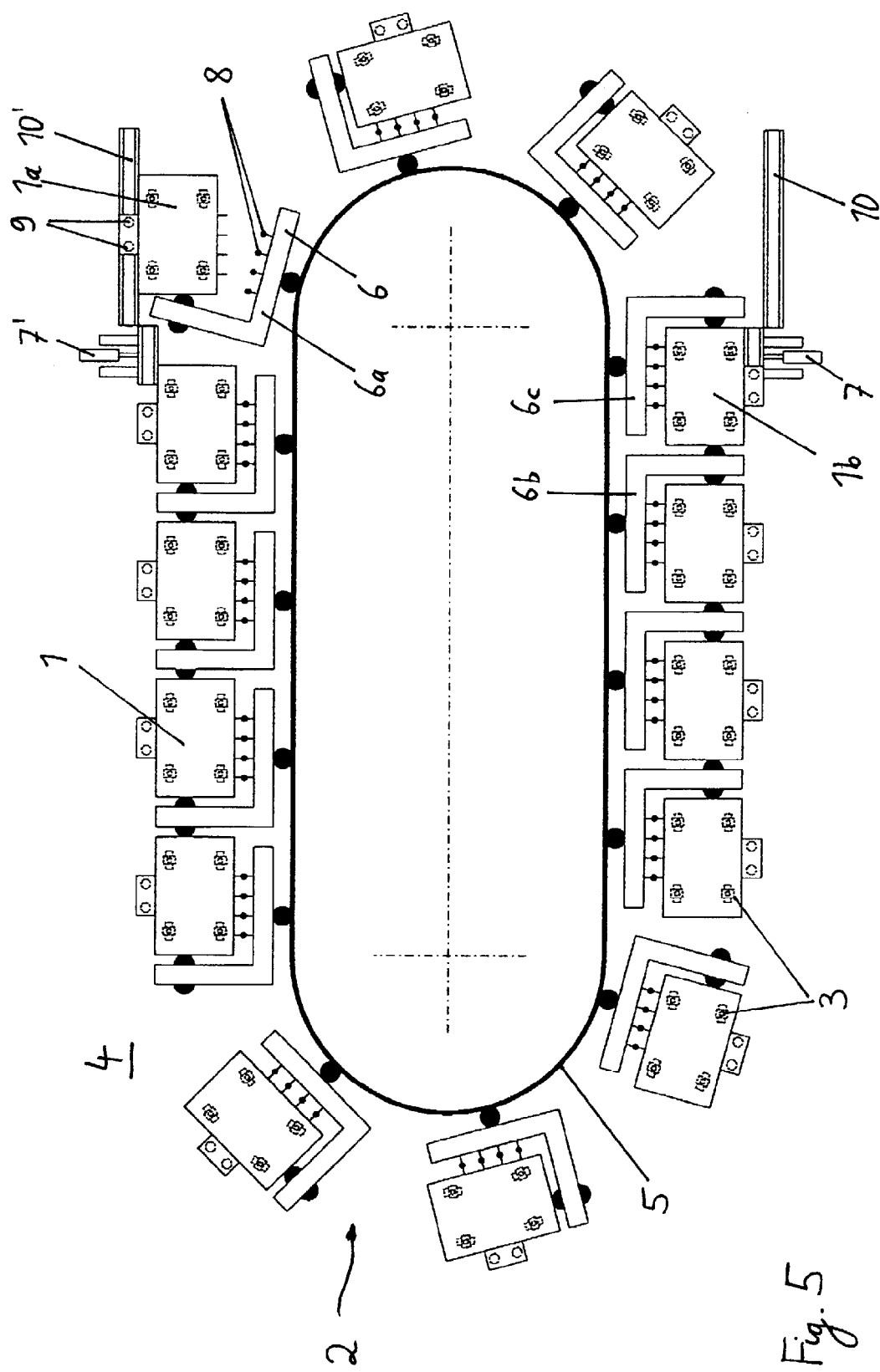

METHOD AND DEVICE FOR THE PRODUCTION OF FORM PARTS

CROSS-REFERENCE TO RELATED APPLICATIONS

This application claims the priority of DE 10 2012 024 674.9 filed Dec. 18, 2012, the priority is hereby claimed and incorporated by reference herein.

The invention relates to a method for the production of form parts from multi-component reactive plastic material, especially from polyurethane, wherein a plurality of moulds are moved by means of mould carriages at least temporarily along a closed, preferably oval, production line. Furthermore, the invention relates to a device for the production of form parts.

DE 44 44 280 C2 discloses a method and a device of the generic kind. The device comprises a production line, which production line is designed, as an elongated oval. Here a plurality of working station is arranged along the coverage of the oval structure, wherein it can also be a matter of mould carriages. In the document a concept is proposed, which allows the supply of the working stations with signals and with energy respectively, namely the supply of the mould carriages with electrical signals and with different energies (e. g. electrical energy, water for tempering, hydraulic oil, vacuum or compressed air).

Also known are facilities, at which a mould with a mould carriage is arranged as an independent carriage, which carriage is coupled on a rotary chain. If such a carriage shall be exported, the carriage which has to take over the exported mould carriage has to be synchronized first with the facility. Then this mould carriage will be moved or pulled upon the other carriage, wherein then the supply lines will be disconnected by means of quick coupling.

It is disadvantageous with this method that a second carriage has to be synchronized first. Furthermore an essential longer swing is necessary, so that the shifting consumes a relatively long time. A subsequent export of several carriages one by one is thereby considerably more difficult to realize and in general not possible.

WO 1999/010155 describes a mould carriage which is hung up including the supply aggregation on a rail system which runs above the mould carriages. Indeed the hanging arrangement causes a very good accessibility to the mould from both sides but on the other side it is structural very complex, because the mould carriage including the aggregations have to be guided and positioned respectively with low position tolerances, wherein the mould carriage including the aggregations have a high weight in the hanging position at least in that region in which the reactive mixture is often automatically injected by a robot.

At facilities of the mentioned kind the rotating mould carriages have to be supplied at least with electrical signals as well as with energy (particularly with pressure energy, preferably with compressed air, if applicable with hydraulic medium or with electrical energy) to be able to fulfill functionalities such as e. g. the opening and the closing of the mould, the locking of the mould or the operating of automated pressure relief valves. Furthermore, a tempering of the mould is normally required, so that the moulds have to be also supplied with a tempering medium (or to heat if needed also with electrical heating energy).

Furthermore, it is necessary in such facilities, that individual molds or mould carriages can be imported or exported for the purpose of maintenance or for the purpose of variation of the form geometry. Of course it is very advantageous in economical point of views, if this has no or at least a very small impact only on the average cycle time of the components and thus on the productivity of the device.

A third important aspect is the cleaning of the production line. Also here it is advantageous due to economical reasons, if the facility efficiency will be influenced hereof as less as possible. The facility concept and the design of the facility have in fact a not irrelevant impact hereupon. A well maintained clean facility has on a continuing basis a very positive effect on the reliability and productivity of the whole process.

With view on the mentioned criteria the pre-known solutions are not yet optimal.

Thus it is an object of the invention, to further develop a method and a device of the kind mentioned above in such a way, that a high position accuracy of the moulds is guaranteed in the production line also in the case of heave moulds. Furthermore, a simple supply of the moulds with signals and energy respectively should be possible. Then, a simple import and export of mould carriages shall be possible into and out of the production line respectively. Finally, a simple cleaning possibility shall be given.

The solution of this object is characterized according to the method in that the mould carriages are provided with rolls and are moved on a stationary ground by the same and that a plurality of supply carriages are arranged along the closed production line at a conveying element, which supply carriages are moved by means of the conveying elements, wherein a mould carriage is approached to a not occupied supply carriage and is coupled with the same to introduce the mould carriage into the production line, wherein here the mould carriage is moved on the stationary ground with its rolls, wherein for the movement along the production line the mould carriage is guided and moved by the supply carriage in a coupled state between the mould carriage and the supply carriage, wherein here the mould carriage is moved with its rolls on the stationary ground, and wherein the mould carriage is decoupled from the supply carriage and is moved away from the production line for taking the mould carriage out of the production line, wherein here the mould carriage is moved with its rolls on the stationary ground.

The invention thus provides that the mould carriages can roll on a stationary ground by means of own (guide) rolls and can be coupled and decoupled to the supply carriages according to the process demands.

Preferably, the mould carriage is supplied by the supply carriage with signals and/or energy in the state in which the mould carriage is coupled with the supply carriage.

In the case in which the production line is designed as closed, preferably oval, path with straight and arcuated sections the mould carriages are exported from the production line preferably at an entry of a straight section into an arcuated section. Respectively, it is preferably provided for this embodiment that the mould carriages are imported into the production line at an entry from an arcuated into a straight section. A mould carriage is thereby preferably moved for the import into the production line at first to a free space between two supply carriages at or into the production line, wherein then the supply carriage which follows in conveying direction pushes the mould carriage onto the supply carriage which is intended for the reception of the mould carriage, whereby the mould carriage is quasi automatically brought synchronically in its coupling position with the supply carriage which receives the mould carriage.

The coupling and the decoupling of a mould carriage at and from a supply carriage takes preferably place by a shift movement of the mould carriage which movement is horizontal and perpendicular to the movement direction of the supply carriage.

A mould carriage which is decoupled from a supply carriage can be pushed out of the production line by a supply carriage which follows this supply carriage.

The device according to the invention for the production of form parts comprises a plurality of moulds arranged on mould carriages and a closed, preferably oval, production line, along which the mould carriages can be moved, wherein the invention is characterized in that the mould carriages are supplied with rolls by which the mould carriages can roll on a stationary ground and that along the closed production line a plurality of supply carriages is arranged at a conveying element which supply carriages can be moved by the conveying element, wherein the mould carriages are designed to be detachable coupled with the supply carriages and wherein displacement means are arranged by which the mould carriage can be moved horizontally and perpendicular to the movement direction of the supply carriage to couple or decouple the mould carriage to the or from the supply carriage.

A further developed embodiment proposes that the mould carriage and the supply carriage are equipped with coupling means by which the mould carriage can be supplied with signals and/or energy from the supply carriage.

The mould carriages comprise according to a beneficial embodiment at least one guide element which is designed for engagement into a guide bar which is arranged at the stationary ground, to guide the mould carriage in the direction of the guide bar.

Hereby, the above mentioned criteria are fulfilled by the method and the device according to the invention in a particular economical way.

At the suggested solution thus it is about a method for the production of form parts from multi-component reactive plastic material, especially from polyurethane, wherein the moulds are moved by means of mould carriages along a closed (e. g. oval) production line; the mould carriages which are arranged in the production line move by themselves on own (guide) rolls across a stationary ground through the production line. In doing so they are each linked on a supply carriage and are guided by it through the production line. A mould carriage, which is in the production line, will thereby be supplied by the supply carriage with signals as well as with energy on which supply carriage the mould carriage is coupled. A mould carriage will be exported from the production line by means that first it will be decoupled from the supply carriage and then be moved out of the production line, wherein it again moves across the stationary ground by its own (guide) rolls. Accordingly a mould carriage will be imported into the production line, in doing so it will be guided to a not occupied supply carriage, wherein it also moves across the stationary ground by its own (guide) rolls; afterwards it will be coupled to the supply carriage.

At the supply carriages it is mostly about carriages, which carriages are permanently coupled on a rotary chain (conveyor element) and on which carriages aggregates are installed for the provision of electrical energy, temper water, pressure energy and/or vacuum.

At the mould carriages it is about carriages on which the mould carriages elements and the molds are arranged. These carriages possess according to the invention own (guide) rolls which move on the stationary ground. This is usually the hall ground or a road which is fixed on the hall ground.

The functional separation of the mould carriage, which has to be imported and exported for the maintenance and for the change of the mould, from the supply carriage, on which supply carriage the aggregates are arranged for the provision of pressure energy (e. g. compressed air) as well as for the tempering, causes, that no more aggregates have to be installed (e. g. temper devices and compressed air reservoirs) than there are places for the mould carriages in the production line. This has relevant economical advantages.

Through that it will be also possible, that for example a temper device or a compressed air reservoir can serve several forms, because these aggregates won't be exported and therefore are independent of thereof, which mould carriages will be exported or imported concretely in that moment, always stay in the production line and are available.

Furthermore the arrangement of the mould carriages with own guide rolls, on which guide rolls the mould carriage moves also within the production line across the hall ground, makes a large convenience and flexibility possible at the importing and exporting and at the following handling of the mould carriages. Advantageously a further transport medium won't be necessary, on which medium the mould carriage will be moved further after the decoupling and whose movement also would have to be synchronized with the conveying facility.

Accordingly a simple and very advantageous importing and exporting of the mould carriages into the production line is ensured.

As already mentioned above the mould carriages will be exported preferably at the entry into the areas of the bends of the production line (in case of an oval design), by decoupling them from the support carriage first by a slight respectively marginal translational horizontal shifting perpendicular to the conveying direction. Afterwards the decoupled carriage will be then moved out of the production line without own drive from the following still coupled supply carriage (if applicable along a guide). The further transport occurs in the simplest case then by manual pushing, it can occur also automatically of course, for example by friction wheels.

The export of the mould carriage in the bend (i. e. in a bent section of the production line) offers thereby several essential advantages compared to an export in a straight area. The carriage has to be only transferred slightly parallel for the decoupling from the supply carriage (translational perpendicular to the conveying direction) and can then continue right away for the export out of the production line. During an export in the area of the straight, an essential bigger parallel displacement is necessary (at least by one whole width of a carriage).

For the further transport of the mould carriage after the export, no additional driven carriage is required; in the easiest case the mould carriage can he moved to its maintenance station by hand. Often, a high automation in the area of maintenance is not reasonable economically, so that the simplicity and the high flexibility of this method are very advantageous. Of course the mould carriage can be transporter further also in an automatic way. A simple possibility are e. g. driven stationary friction wheels, which actuate the mould carriage.

The further described embodiments allow the use of further advantages of the invention. Hereafter the mould carriages will be imported from the transition of the bent area into the straight area of the oval (or if applicable for example also in form of a rounded rectangle) production line, at first by moving them again to a free space between two supply carriages, wherein then they will be transported further and positioned from the following support carriage, before they will be then coupled again to the supply carriage by translational shifting perpendicular to the conveying direction (parallel shifting).

Additionally the suggested method also causes a simple cleaning of the track of the facility. At the production of form parts, mostly vehicle seat cushion made from polyurethane soft foam, planed waste occurs at each mould. Thereby it is a matter of foam rests which accrue at the venting point of the moulds. Likewise insert parts such as wires or texture frazzles can get onto the track. If such contaminations won't be removed on a regular basis, the function of the facility is strongly jeopardized. With the suggested method an easy import of a cleaning carriage into the production line is possible as well as a very simple cleaning of the ground, on which the mould carriages move. Because the whole carriage can be exchanged very easily, the design of the cleaning carriage can be optimized concerning the cleaning function. So that the import and export function well analog to the import and export of the mould carriages, only the dimensions of the cleaning carriage have to correspond with respect to the stops of the supply carriages with those of the mould carriages. The cleaning carriage can then be connected at least electrically to a supply carriage and will be supplied by it with electrical energy.

Also, the mould carriage needs not to be led continuous between the import and export point along the given lanes. In many cases a manual pushing of the mould carriages within the maintenance area is more reasonable in terms of economy which is not obligated to given stationary lanes due to the high flexibility and due to the low investment costs. Because the mould carriage is equipped with guide rolls this simple and uncomplicated handling of the mould carriages in the maintenance area is realizable without any problems.

Accordingly the invention provides an economical method, to import and export respectively a single mould carriage into or out of a (oval) conveying device. In this connection the aspects of the economy are particularly the investment cost, the cycle times and the utilization of the facility respectively, especially in consideration of a frequent change of moulds and of the maintenance and cleaning respectively of the facility.

A functional separation will be provided on the one hand of the circling transportation carriages concerning the energy respectively the signal support and on the other hand of the mould carrier, that is to say a separation into a supply carriage and into a mould carriage. The mould carriage is designed as an autarkic unit (with guide rolls), which doesn't have to be taken over from another transport carriage after the decoupling from the supply carriage. Through that, advantageously, a synchronization of the transport carriage with the facility is not necessary, which synchronization otherwise would have been necessary. Through this also a large amount of mould carriages can get exchanged directly one after the other without any waste of time.

Further a simple import and export of a cleaning carriage will be possible.

In the drawings an embodiment of the invention is depicted. It shows:

FIG. 1 in a top plan view a production line with an oval conveying element with a plurality of supply carriages and mould carriages and FIG. 2 to FIG. 5 stepwise the import and export of a mould carriage in the production line.

In FIG. 1 a production line 2 is depicted schematically. It comprises a conveying element 5 (rotating chain), which conveying element is designed presently as oval conveyor. Supply carriages 6 are fixed on the rotating chain 5. The supply carriages 6 are designed to couple detachably on each of them a mould carriage 1; on the mould carriages 1 there is a mould for the production of a form part.

The support lines of the support carriages 6 are connected via coupling means 8 in form of quick coupling with the corresponding lines 11 of the mould carriage 1.

The halves of the mould can be lifted or lowered and be swung respectively depending on the application. The opening and closing of the moulds occurs preferably across stationary bases (not depicted), which are passed by the mould carriage 1. Then the bases move a stop at the mould which stop is connected with a set of levers. Then, by this set of levers each mould half can be moved/swung around a swivel bearing.

Each mould carriage 1 rolls on four articulated rolls 3 across the stationary ground 4. Outside the mould carriage 1 two guide rolls 9 are fixed. By these guide rolls 9 the mould carriage 1 can be moved parallel, i. e. horizontal and perpendicular to the conveying direction, across a stationary traversing slide 12, 12' by means of a stationary displacement means 7, 7' (stationary cylinder) or also by means of another stationary device at the import and export respectively of a mould carriage 1. Furthermore the guide rolls 9 arrange, that the mould carriage 1 will be moved further after the export from the support carriage 6 by means of a stop 13 in a guide bar 10'. Analog a guide bar 10 serves the guided lead of a mould carriage 1 during the import. Likewise analog to the export the mould carriage 1 can be shifted parallel during the import across the traversing slide 12 by means of the stationary displacement means 7 across the guide rolls 9.

In the FIGS. 2 to 5 the import and export of a mould carriage 1 from respectively into the production line 2 is depicted here step by step for the preferred embodiment.

During the export the mould carriage 1a will be shifted parallel at the entry into the bend area of the oval conveying element 5 first across the stationary traversing slide 12' by means of the stationary displacement means 7', i. e. translational into the direction perpendicular to the conveying direction. The decoupled mould carriage 1a will be pushed further from the supply carriage 6a across the stop 13. The guide bar 10', which is fixed on the ground, arranges that the carriage 1a will be led straight ahead. For the further handling the carriage 1a can be moved further by hand or can be taken over from another conveying line.

During the import of a mould carriage into the oval conveyor the mould carriage 1b which has to be imported will be pushed first across the guide bar 10 between the preparatory support carriage 6b and the support carriage 6c, which has to take over the mould carriage 1b. It will be positioned in the correct position at. the run-out. of the bend between the stop 13 of the preparatory supply carriage 6b and the stop 13 of the support carriage 6c, which has to take over the mould carriage 1b. Across the stationary traversing slide 12 the mould carriage 1b which has to be imported will be shifted parallel by means of the stationary displacement means 7; in doing so the support lines will be connected with another by the quick coupling means 8.

LIST OF REFERENCES

1 Mould carriage
1a Mould carriage

1b Mould carriage
2 Production line
3 Roll (guide roll)
4 Stationary ground
5 Conveying element (rotating chain)
6 Supply carriage
6a Supply carriage
6b Supply carriage
6c Supply carriage
7 Displacement means
7' Supply carriage
8 Coupling means (quick coupling)
9 Guide element (guiding roll)
10 Guide bar
10' Guide bar
11 Line
12 Stationary traversing slide
12' Stationary traversing slide
13 Stop

The invention claimed is:

1. Method for the production of form parts from multi-component reactive plastic material, comprising:
moving a plurality of moulds by means of mould carriages at least temporarily along a closed production line,
wherein the mould carriages are provided with rolls and are moved on a stationary ground by the same and a plurality of supply carriages are arranged along the closed production line at a conveying element, which supply carriages are moved by means of the conveying element,
wherein a mould carriage is approached to a not occupied supply carriage and is coupled with the same to introduce the mould carriage into the production line, wherein here the mould carriage is moved on the stationary ground with its rolls,
wherein for the movement along the production line the mould carriage is guided and moved by the supply carriage in a coupled state between the mould carriage and the supply carriage, wherein here the mould carriage is moved with its rolls on the stationary ground, and
wherein the mould carriage is decoupled from the supply carriage and is moved away from the production line for taking the mould carriage out of the production line, wherein here the mould carriage is moved with its rolls on the stationary ground, and
wherein the supply carriage supplies energy to the mould carriage in the state in which the mould carriage is coupled with the supply carriage, and the energy is in the form of at least one of electrical energy, tempering water, compressed pressure energy, and vacuum energy.

2. Method according to claim 1, wherein the mould carriage is supplied by the supply carriage with signals in the state in which the mould carriage is coupled with the supply carriage.

3. Method according to claim 1, wherein the production line is designed as closed path with straight and arcuated sections and the mould carriages are exported from the production line at an entry of a straight section into an arcuated section.

4. Method according to claim 1, wherein the production line is designed as closed path with straight and arcuated sections and the mould carriages are imported into the production line at an entry from an arcuated section into a straight section.

5. Method according to claim 4, wherein the mould carriage is moved for the import into the production line at first to a free space between two supply carriages in the production line, wherein then the supply carriage which follows in conveying direction pushes the mould carriage onto the supply carriage which is intended for the reception of the mould carriage, whereby the mould carriage is brought synchronically in its coupling position with the supply carriage which receives the mould carriage.

6. Method according to claim 1, wherein the coupling and the decoupling of the mould carriage to and from the supply carriage takes place by a shift movement of the mould carriage which movement is horizontal and perpendicular to the movement direction of the supply carriage.

7. Method according to claim 1, wherein the mould carriage which is decoupled from the supply carriage is pushed out of the production line by another of the supply carriages which follows the supply carriage.

* * * * *